United States Patent
Nichols

(10) Patent No.: US 11,480,969 B2
(45) Date of Patent: Oct. 25, 2022

(54) METHOD AND SYSTEM FOR CONSTRUCTING STATIC DIRECTED ACYCLIC GRAPHS

(71) Applicant: Argo AI, LLC, Pittsburgh, PA (US)

(72) Inventor: Gregory Boyd Nichols, Franklin Park, PA (US)

(73) Assignee: Argo AI, LLC, Pittsburgh, PA (US)

( * ) Notice: Subject to any disclaimer, the term of this patent is extended or adjusted under 35 U.S.C. 154(b) by 372 days.

(21) Appl. No.: 16/735,820

(22) Filed: Jan. 7, 2020

(65) Prior Publication Data
US 2021/0208591 A1 Jul. 8, 2021

(51) Int. Cl.
*G05D 1/02* (2020.01)
*G05D 1/00* (2006.01)
(Continued)

(52) U.S. Cl.
CPC ......... *G05D 1/0214* (2013.01); *G05D 1/0088* (2013.01); *G05D 1/0223* (2013.01); *G06F 9/3005* (2013.01); *G06F 16/9024* (2019.01); *G06V 20/56* (2022.01); *G05D 2201/0213* (2013.01)

(58) Field of Classification Search
CPC .............. G05D 1/0214; G05D 1/0088; G05D 1/0223; G05D 2201/0213; G06F 9/3005; G06F 16/9024; G06F 8/41; G06V 20/56; G06K 9/6296
See application file for complete search history.

(56) References Cited

U.S. PATENT DOCUMENTS

2002/0065857 A1 5/2002 Michalewicz et al.
2018/0004495 A1 1/2018 Varadarajan et al.
(Continued)

FOREIGN PATENT DOCUMENTS

WO 20180091909 A1 5/2018
WO WO-2018087551 A * 5/2018 ......... G01C 21/3446

OTHER PUBLICATIONS

How to model a directed acyclic graph at compile-time? : haskell; https://www.reddit.com/r/haskell/comments/63yw0r/how_to_model_a_directed_acyclic_graph_at/; Oct. 6, 2019.
(Continued)

*Primary Examiner* — Rodney A Butler
(74) *Attorney, Agent, or Firm* — Fox Rothschild LLP

(57) ABSTRACT

At compile-time, a processor develops a computer program by receiving an input that includes multiple nodes and connections between pairs of the nodes. The nodes represent object properties such as properties of objects that an autonomous vehicle (AV) detects while moving about an environment. For each node, the system will identify a depth that represents a number of nodes along a longest path from that node to any available input node. The system will order the nodes by depth in a sequence, and it will build a graph-based program specification that includes the nodes in the sequence, along with the connections. The graph-based program specification may correspond to a directed acyclic graph (DAG). The system will compile the graph-based program specification into a computer-readable program, and it will save the computer-readable program to a memory so that the AV or other system can use it at run-time.

20 Claims, 4 Drawing Sheets

(51) Int. Cl.
    *G06F 9/30*     (2018.01)
    *G06F 16/90*     (2019.01)
    *G06V 20/56*     (2022.01)
    *G06F 16/901*     (2019.01)

(56) References Cited

U.S. PATENT DOCUMENTS

| | | |
|---|---|---|
| 2018/0081919 A1 | 3/2018 | Stanfill et al. |
| 2018/0267784 A1 | 9/2018 | Wang et al. |
| 2019/0042900 A1 | 2/2019 | Smith et al. |
| 2019/0278593 A1 | 9/2019 | Elango et al. |

OTHER PUBLICATIONS

Dag: Compile-time, type-safe directed acyclic graphs; hackage.haskell.org/package/dag; Oct. 6, 2019.

How to build up a directed graph at compile time?; https://stackoverflow.com/questions/23058926/how-to-build-up-a-directed-graph-at-compile-time; Oct. 6, 2019.

Efficient compile-time directed graph; https://codereview.stackexchange.com/questions/82308/efficient-compile-time-directed-graph; Oct. 6, 2019.

How to find LCA in a directed acyclic graph?; https://cs.stackexchange.com/questions/90119/how-to-find-ICA-in-a-directed-acyclic-graph; Oct. 6, 2019.

\* cited by examiner

METHOD AND SYSTEM FOR CONSTRUCTING STATIC DIRECTED ACYCLIC GRAPHS

BACKGROUND

When an autonomous vehicle (AV) moves about an environment, the vehicle's operating systems must predict the trajectory or other actions that detected actors (that is, objects encountered in the environment) may take. To do this, the vehicle's prediction systems must determine many properties of the object, such as velocity, shape, direction, type or class, and other properties. These properties help the system assess whether the object is, for example, a parked car, a moving bicycle, a person who is stepping into a crosswalk, etc.

Many of the determined properties will depend on other properties of the object. This means that the system must determine certain properties in a particular order. Following the previous example, this means that the system must determine a vehicle's velocity before determining whether it is parked. To do this, the system must develop and follow a set of instructions, typically represented in a graph format, to determine various properties of detected objects.

This document describes methods and systems that are directed to addressing the problems described above, and/or other issues.

SUMMARY

In various embodiments, a processor executes a compiler program and, at compile-time, develops a program for controlling a computing device. As part of this method, the compiler/processor will receive an input that includes multiple nodes and connections between pairs of the nodes. The system will identify a depth for each node, wherein the depth for each node comprises an encoding that represents a number of nodes that exist along a longest path from that node to any available input node. The system will order the nodes by depth in a sequence, and it will build a graph-based program specification that includes the nodes in the sequence, along with the connections. The graph-based program specification may correspond to a directed acyclic graph (DAG). The system will compile the graph-based program specification into a computer-readable program, and it will save the computer-readable program to a memory.

At runtime, a computing device may then execute the computer-readable program and implement a process flow that follows the sequence of the graph-based program specification, while maintaining the sequence without changing the order of the nodes.

Optionally, the computing device may be that a system of an autonomous vehicle. For example, it may be part of an autonomous visualization system for an autonomous vehicle. If the computing device is for an autonomous vehicle, each node may represent a property of an object that one or more sensors of the autonomous vehicle may encounter in an environment. Then, at runtime, an operating system of the autonomous vehicle may receive, from one or more sensor systems of the autonomous vehicle, data that detects an actor in the environment. The operating system may then use the graph-based program specification to determine various properties of the actor.

Example object properties that the nodes may represent may include, for an object that is a vehicle, a first node indicating whether the vehicle is parked. One or more ancestor nodes of the graph-based program specification may represent properties such as yaw of the vehicle, velocity of the vehicle, a distance between the vehicle and a curb, brake light status of the vehicle, whether the vehicle is near a stop sign or intersection, a time at which the vehicle has remained stationary, and/or identification of a lane in which the vehicle is positioned.

If the object is a pedestrian, then for example a first node may indicate whether the person is jaywalking. One or more ancestor nodes may represent whether the person is at a crosswalk, the lane in which the person is walking, and/or the distance of the person from an intersection.

In various embodiments, each node may represent a value of an object property and a formula that identifies one or more additional object properties that are required to update the value of the object property. Each connection that extends from any node may represent a formula that uses the value of the node from which the connection extends.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

As noted in the Background section above, when predicting actions of an object, an autonomous vehicle (AV) prediction system must determine various properties of the object. Some of these properties will depend on other properties of the object. This means that the system must determine certain properties in a particular order.

Figure 1:
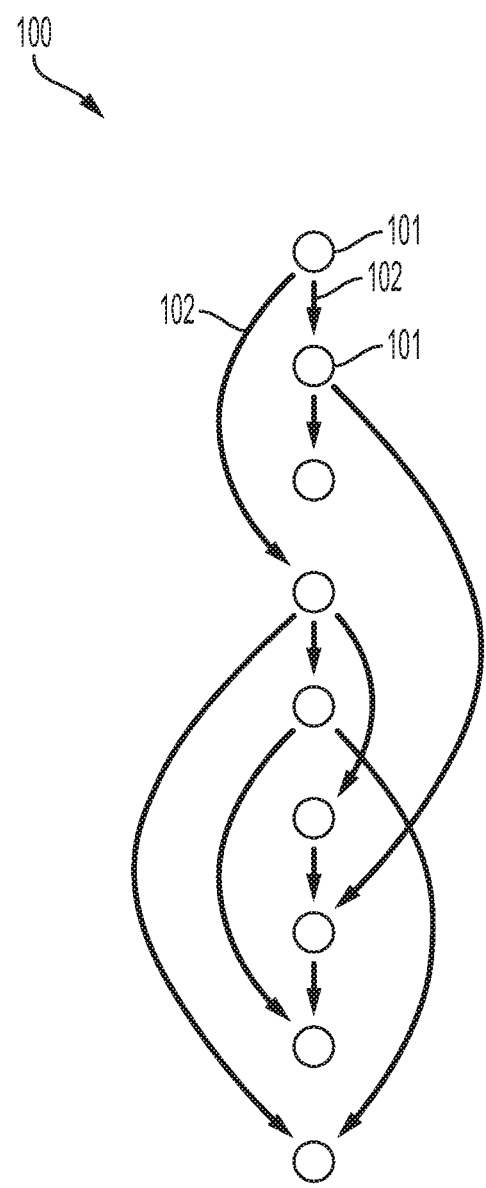
FIG. 1 illustrates a simple example of a directed acyclic graph (DAG).

Computations such as this can map to a representation as a directed acyclic graph (DAG). Referring to the simple illustration of FIG. 1, a DAG is a graph 100 with multiple nodes 101 (which also may be called vertices) and connections 102 between pairs of nodes (which connections also may be called edges or arcs). Each connection 102 is directed from one node 101 to another, so that a path that follows a sequence of connections away from any node will never lead back to that node. Thus, a directed graph exhibits any number of topological orderings that an AV may use to determine various properties of a detected object.

Figure 2:
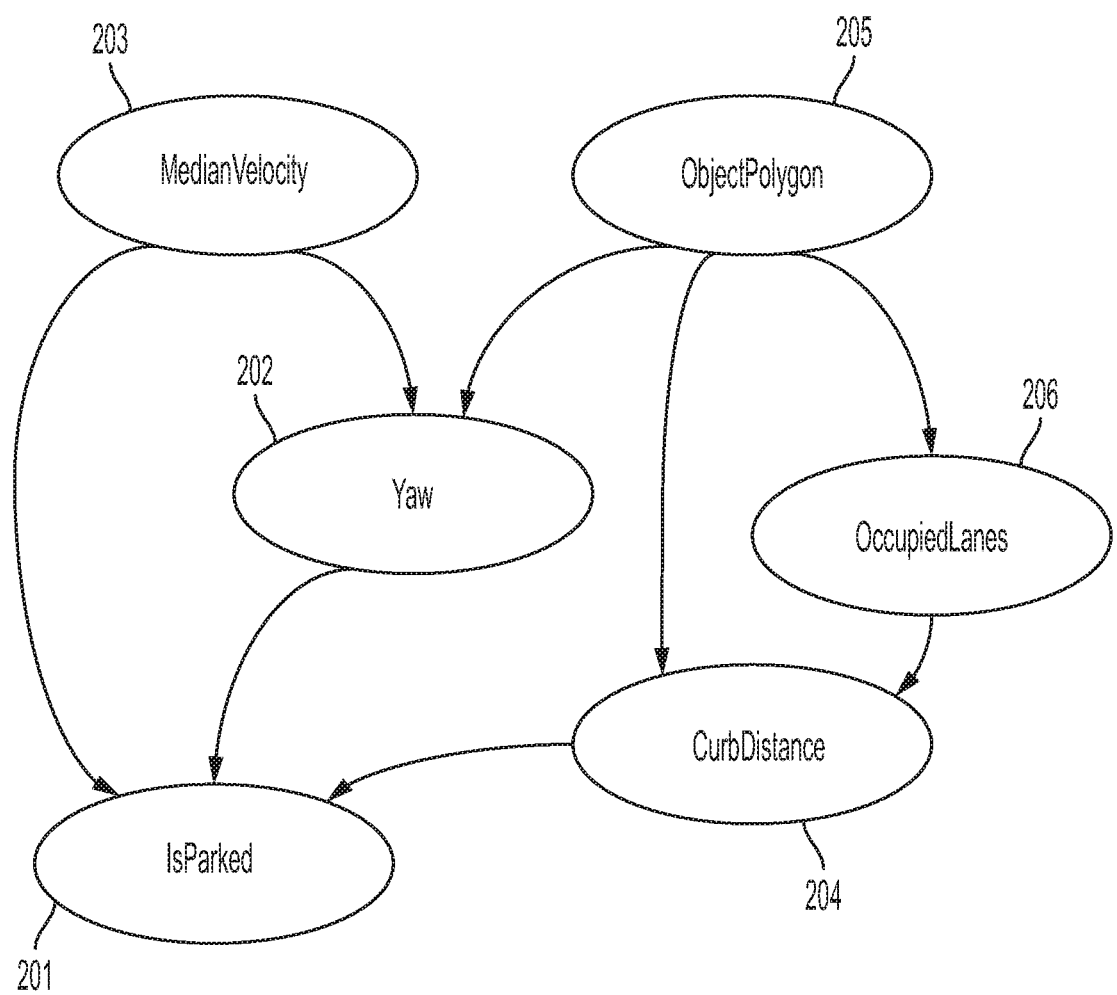
FIG. 2 illustrates example components of a DAG that an autonomous vehicle may use to determine properties of an object that the vehicle detects in an environment.

AV prediction systems may construct and use a DAG to determine the properties of an object, in proper order, at runtime when the AV's sensors detect the object in the environment. A simple example is shown in FIG. 2, which shows various object properties as nodes, and which also shows relationships between properties as connections. In FIG. 2, the IsParked property 201 of an object (which indicates whether the object is parked) depends on the object's Yaw property 202, which in turn depends on the Median Velocity property 203. The IsParked property 201 also depends on the MedianVelocity property 203 and the object's CurbDistance property 204 (which indicates a distance that the object is away from a street curb). In FIG. 2, if the IsParked property 201 is considered to be a first node of interest, then the Yaw property 202, Median Velocity property 203, and CurbDistance property 204 nodes all may be considered to be ancestor nodes to the first node.

In practice, DAGs used by an AV will be much more complex than that shown in FIG. 2. For example, the IsParked property 201 also may depend on many other properties of the detected vehicle (and thus have additional ancestor nodes), such as the detected vehicle's brake light status, whether the detected vehicle is at a stop sign or intersection, an amount of time during which the detected vehicle is determined to be stationary, the lane in which the vehicle is positioned (i.e., is it a parking lane or a travel lane) and/or other properties. In addition, an AV will typically store and use multiple DAGs for multiple object types or other situations. For example, the AV also may store a DAG that it uses to determine whether a person is jaywalking. In such a situation, the node indicating whether the person is jaywalking may have ancestor nodes indicating properties of the person such as whether the person is at a crosswalk, the lane in which the person is walking, the distance of the person from an intersection, or other properties.

Typically, an AV's processor will build a DAG during runtime, while the vehicle is moving through the environment. This enables the system to reconfigure the graph, adding nodes and connections at any time. However, this imposes an efficiency cost in that it takes computational time and resources that could be used for other processes, such as the actual prediction process. It also takes energy, thus reducing the vehicle's operating efficiency.

To address these issues, this document describes a method and system by which an AV may build a DAG at compile-time, rather than at runtime. Compile-time refers to a set of events in which code is converted to one or more executable file, before the AV actually uses the code to detect properties of detected objects; runtime refers to the events associated with detection of object properties, while the executable is running. During the compilation phase of software development, the compiler will determine a correct order for each node that is identified or updated, such that each node's dependencies are updated before the node itself is updated. The complier is a computer program that converts source code into executable code, executed by a processor that is part of the vehicle or remote from the vehicle.

Figure 3:
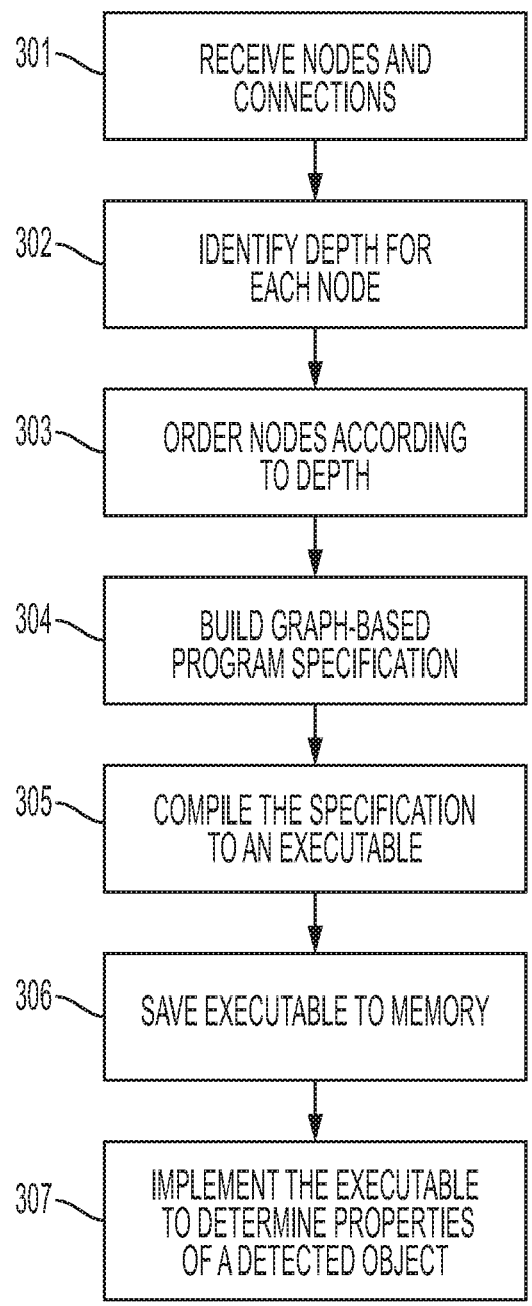
FIG. 3 illustrate an example process of building and using a DAG at compile-time.

With reference to FIG. 3, at 301 a processor that is associated with a compiler may do this by receiving an input that comprises a set of nodes and connections between pairs of the nodes. Any node may have one or more ancestors, as is illustrated in the example structures shown in FIGS. 1 and 2. The system may receive this input from a previously stored graph file that it retrieves from memory, from another type of data file, by user input from a user interface of a computing device, by a combination of these modes and/or by other modes.

At 302, the system will identify a depth for each node. The depth for each node is an encoding that represents how many ancestors the node has along the longest possible path to an available input node of the graph (i.e., the length of the longest path to input, where an input node is a node that has no ancestors). Optionally, the encoding may have a value that equals the maximum depth of any node, plus 1. Referring to the example graph of FIG. 2, the system may assign the following depths to each node:

CurbDistance property 204: depth=3 (which includes CurbDistance 204, OccupiedLanes 206, and input node ObjectPolygon 205; note that shorter paths are available to both the Median Velocity 203 and ObjectPolygon 205 input nodes, but only the longest possible path that is available from all possible paths to any input node is selected to be the depth);

(1) IsParked property 201: depth=4 (which includes IsParked 201, CurbDistance 204, OccupiedLanes 206, and input node ObjectPolygon 205);

(2) Yaw property 202: depth=2.

(3) Median Velocity property 203: depth=1 (as it is an input node);

(4) CurbDistance property 204: depth=3;

(5) ObjectPolygon property 205: depth=1 (also an input node); and (6) OccupiedLanes property 206: depth=2.

At 303, the system will order the nodes by depth in a sequence. In the example above, the sequence would be:

(1) Median Velocity property 203: depth=1;

(2) ObjectPolygon property 205: depth=1;

(3) OccupiedLanes property 206: depth=2;

(4) Yaw property 202: depth=2;

(5) CurbDistance property 204: depth=3; and (6) IsParked property 201 depth=4.

At 304, the system will then build a graph-based program specification (i.e., an instruction set) that includes the nodes in the sequence, along with the connections. This ensures that during any execution, if the value of any node updates, the values of its ancestors will update before the node itself updates. It also ensures that when any ancestor node is updated, that update will carry through to its dependent (child) nodes. By determining depth and ordering the nodes in the way described above, the system assigns the maximum possible length of each node to an input as the depth, thus ensuring that any other input to that node will have a shorter path. Then, once ordered by depth, the node with longest depth will end up after all of its inputs.

At 305, the system will compile the graph-based program specification into a computer-readable program. In various embodiments, the graph-based program specification may corresponds to a DAG as described above.

At 306 the system will save the computer-readable program to a memory for use by a device during runtime. For example, the system may save the program to a memory of an AV for use by the AV's perception system. It should also be noted that the compiler may include, and any of the steps described above may be performed by, a processor that is a component of the AV, or by a separate processing device that generates the program which is then loaded onto the AV's memory.

Then during runtime, at 307 the AV or other device may execute the computer-readable program and implementing a process flow that follows the sequence of the graph-based program specification, while maintaining the sequence without changing the order of the nodes.

For example, if the device that implements the process flow is a computing system of an AV, then each node may represent a property of an object that one or more sensors of the autonomous vehicle may encounter in an environment. If so, then during runtime the operating system of the AV may receive data that detects an actor in the environment. The system may receive this data from the AV's LiDAR system, cameras, and/or other sensors. The system may then use the graph-based program specification to determine properties of the actor.

For example, to determine whether an actor that is a vehicle is parked, the system may access the graph specification to identify a first node indicating whether the vehicle is parked. It may then access one or more ancestor nodes such as yaw of the vehicle, a velocity of the vehicle, a distance between the vehicle and a curb, brake light status of the vehicle, whether the vehicle is near a stop sign or intersection, a time at which the vehicle has remained stationary and/or identification of a lane in which the vehicle is positioned. It will determine values for the ancestor nodes in sequence and save the determined values in each node, and then it will use the ancestor node values to determine or update the value of the "is the vehicle parked" node, using the node's formula.

By way of another example, for an actor that is a pedestrian the system may identify a first node indicating whether the person is jaywalking. To determine the value of this node, the system may first determine values for ancestor nodes such as nodes indicating whether the person is at a crosswalk, the lane in which the person is walking, and/or the distance of the person from an intersection. It will determine values for the ancestor nodes in sequence and save the determined values in each node, and then it will use the ancestor node values to determine or update the value of the "is the pedestrian jaywalking" node, using the node's formula.

While the description above uses the example application of an AV, the processes described above are generally for developing a program at compile-time for use by any computing device during runtime. Other applications of these methods may include other computing device applications such as programs for scheduling jobs or tasks, encryption techniques and other cryptographic programs, and other applications.

Figure 4:
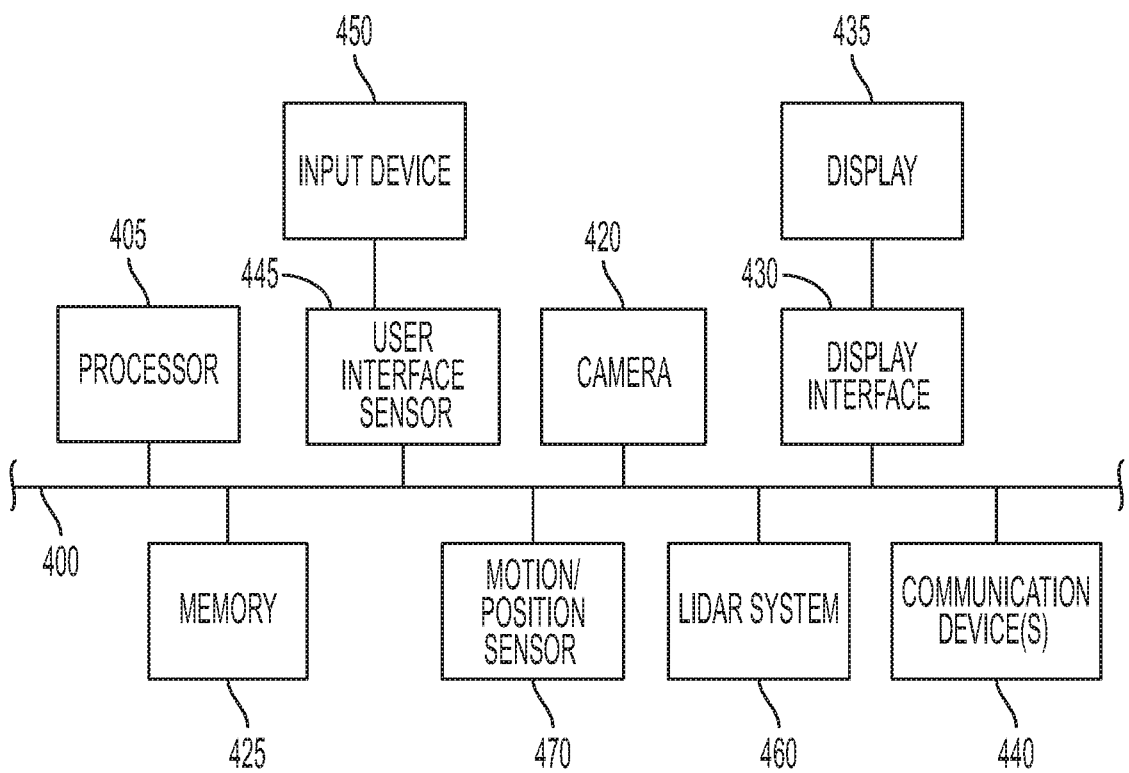
FIG. 4 illustrates example elements of an autonomous vehicle and/or external electronic device.

FIG. 4 is a block diagram that depicts example hardware elements that may be included in any of the electronic components of the system, such as internal processing systems of an AV or computing device, or remote servers (such as that associated with a compiler). An electrical bus 400 serves as an information highway interconnecting the other illustrated components of the hardware. Processor 405 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 425. A memory device may include a single device or a collection of devices across which data and/or instructions are stored. Various embodiments of the invention may include a computer-readable medium containing programming instructions that are configured to cause one or more processors to perform the functions described in the context of the previous figures.

An optional display interface 430 may permit information from the bus 400 to be displayed on a display device 435 in visual, graphic or alphanumeric format, such on an in-dashboard display system of the vehicle. An audio interface and audio output (such as a speaker) also may be provided. Communication with external devices may occur using various communication devices 440 such as a wireless antenna, a radio frequency identification (RFID) tag and/or short-range or near-field communication transceiver, each of which may optionally communicatively connect with other components of the device via one or more communication system. The communication device(s) 440 may be configured to be communicatively connected to a communications network, such as the Internet, a local area network or a cellular telephone data network.

The hardware may also include a user interface sensor 445 that allows for receipt of data (such as node and connection definition data) from input devices 450 such as a keyboard or keypad, a joystick, a touchscreen, a touch pad, a remote control, a pointing device and/or microphone.

The system also may include sensors that the system uses to detect actors in the environment. The sensed data may include digital image frames received from a camera 420 that can capture video and/or still images. The system also may receive data from a LiDAR system 460 such as that described earlier in this document. The system also may receive data from a motion and/or position sensor 470 such as an accelerometer, gyroscope or inertial measurement unit.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other systems.

In this document, the terms "street," "lane" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" may represent an airway and a lane may be a portion of the airway. If the autonomous vehicle is a watercraft, then the term "street" may represent a waterway and a lane may be a portion of the waterway.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The invention claimed is:

1. A method of developing a program for controlling a computing device, the method comprising:
by a processor, executing a compiler program that causes the processor to:
receive an input that comprises a plurality of nodes and a plurality of connections between pairs of the nodes;
identify a depth for each node, wherein the depth for each node comprises an encoding that represents a number of nodes that exist along a longest path from that node to any available input node;
order the nodes by depth in a sequence;
build a graph-based program specification that includes the nodes in the sequence, along with the connections;
compile the graph-based program specification into a computer-readable program; and
save the computer-readable program to a memory for use by a computing device during runtime.

2. The method of claim 1, wherein the graph-based program specification corresponds to a directed acyclic graph (DAG).

3. The method of claim 1 further comprising, by the computing device during runtime:
executing the computer-readable program and implementing a process flow that follows the sequence of the graph-based program specification, while maintaining the sequence without changing the order of the nodes.

4. The method of claim 1, wherein:
the computing device is a system of an autonomous vehicle; and
each node represents a property of an object that one or more sensors of the autonomous vehicle may encounter in an environment.

5. The method of claim 4, further comprising, by an operating system of the autonomous vehicle at runtime:
receiving, from one or more sensor systems of the autonomous vehicle, data that detects an actor in the environment; and
using the graph-based program specification to determine a plurality of properties of the actor.

6. The method of claim 4, wherein object properties that the nodes may represent comprise one or more of the following:
for an object that is a vehicle:
for a first node, a property indicating whether the vehicle is parked, and
for one or more ancestor nodes, properties that comprise yaw of the vehicle, a velocity of the vehicle, a distance between the vehicle and a curb, brake light status of the vehicle, whether the vehicle is near a stop sign or intersection, a time at which the vehicle has remained stationary, identification of a lane in which the vehicle is positioned; and
for an object that is a pedestrian:
for a first node, a property indicating whether the person is jaywalking, and
for one or more ancestor nodes, properties that comprise whether the person is at a crosswalk, the lane in which the person is walking, or the distance of the person from an intersection.

7. The method of claim 2, wherein:
each node represents a value of an object property and a formula that identifies one or more additional object properties that are required to update the value of the object property; and
each connection that extends from any node represents a formula that uses the value of the node from which the connection extends.

8. The method of claim 1, further comprising, by an autonomous visualization system for an autonomous vehicle after the compiling is complete, using the graph-based program specification at runtime.

9. A system for developing a program for controlling a computing device, the system comprising:
a processor that is associated with a compiler; and
a computer-readable medium containing programming instructions that are configured to, when executed, cause the processor to:
receive an input that comprises a plurality of nodes and a plurality of connections between pairs of the nodes,
identify a depth for each node, wherein the depth for each node comprises an encoding that represents a number of nodes that exist along a longest path from that node to any available input node,
order the nodes by depth in a sequence,
build a graph-based program specification that includes the nodes in the sequence, along with the connections,
compile the graph-based program specification into a computer-readable program, and
save the computer-readable program to a memory.

10. The system of claim 9, wherein the graph-based program specification corresponds to a directed acyclic graph (DAG).

11. The system of claim 9, further comprising a computing device, wherein the computing device is configured to, during runtime:
execute the computer-readable program, and by doing so implement a process flow that follows the sequence of the graph-based program specification while maintaining the sequence without changing the order of the nodes.

12. The system of claim 11, further comprising an autonomous vehicle, and wherein:
the autonomous vehicle comprises the computing device; and each node represents a property of an object that one or more sensors of the autonomous vehicle may encounter in an environment.

13. The system of claim 12, wherein:
the autonomous vehicle comprises an operating system; and
the operating system stores additional programming instructions that are configured to cause the autonomous vehicle to, at runtime:
receive, from one or more sensor systems of the autonomous vehicle, data that detects an actor in the environment, and
use the graph-based program specification to determine a plurality of properties of the actor.

14. The system of claim 12, wherein object properties that the nodes may represent comprise one or more of the following:
for an object that is a vehicle:
for a first node, a property indicating whether the vehicle is parked, and
for one or more ancestor nodes, properties that comprise yaw of the vehicle, a velocity of the vehicle, a distance between the vehicle and a curb, brake light status of the vehicle, whether the vehicle is near a stop sign or intersection, a time at which the vehicle has remained stationary, identification of a lane in which the vehicle is positioned; and
for an object that is a pedestrian:
for a first node, a property indicating whether the person is jaywalking, and
for one or more ancestor nodes, properties that comprise whether the person is at a crosswalk, the lane in which the person is walking, or the distance of the person from an intersection.

15. The system of claim 13, wherein:
each node represents a value of an object property and a formula that identifies one or more additional object properties that are required to update the value of the object property; and
each connection that extends from any node represents a formula that uses the value of the node from which the connection extends.

16. The system of claim 9, further comprising an autonomous vehicle, and wherein the computing device comprises an autonomous visualization system for the autonomous vehicle.

17. A computer program product for developing a program for controlling a computing device, the product comprising:
a computer-readable medium containing programming instructions that are configured to, when executed, cause a processor that is associated with a compiler to:
receive an input that comprises a plurality of nodes and a plurality of connections between pairs of the nodes,
identify a depth for each node, wherein the depth for each node comprises an encoding that represents a number of nodes that exist along a longest path from that node to any available input node,
order the nodes by depth in a sequence,
build a graph-based program specification that includes the nodes in the sequence and that corresponds to a directed acyclic graph (DAG),
compile the graph-based program specification into a computer-readable program, and
save the computer-readable program to a memory for use by a computing device during runtime.

18. The product of claim 17, wherein each node represents a property of an object that one or more sensors of an autonomous vehicle may encounter in an environment.

19. The product of claim 17, wherein object properties that the nodes may represent comprise one or more of the following:
for an object that is a vehicle:
for a first node, a property indicating whether the vehicle is parked, and
for one or more ancestor nodes, properties that comprise yaw of the vehicle, a velocity of the vehicle, a distance between the vehicle and a curb, brake light status of the vehicle, whether the vehicle is near a stop sign or intersection, a time at which the vehicle has remained stationary, identification of a lane in which the vehicle is positioned; and
for an object that is a pedestrian:
for a first node, a property indicating whether the person is jaywalking, and
for one or more ancestor nodes, properties that comprise whether the person is at a crosswalk, the lane in which the person is walking, or the distance of the person from an intersection.

20. The product of claim 17, wherein:
each node represents a value of an object property and a formula that identifies one or more additional object properties that are required to update the value of the object property; and
each connection that extends from any node represents a formula that uses the value of the node from which the connection extends.

* * * * *